Aug. 22, 1933.　　　　F. PALLUCH　　　　1,923,277
STROBOSCOPIC DEVICE
Filed Feb. 6, 1931
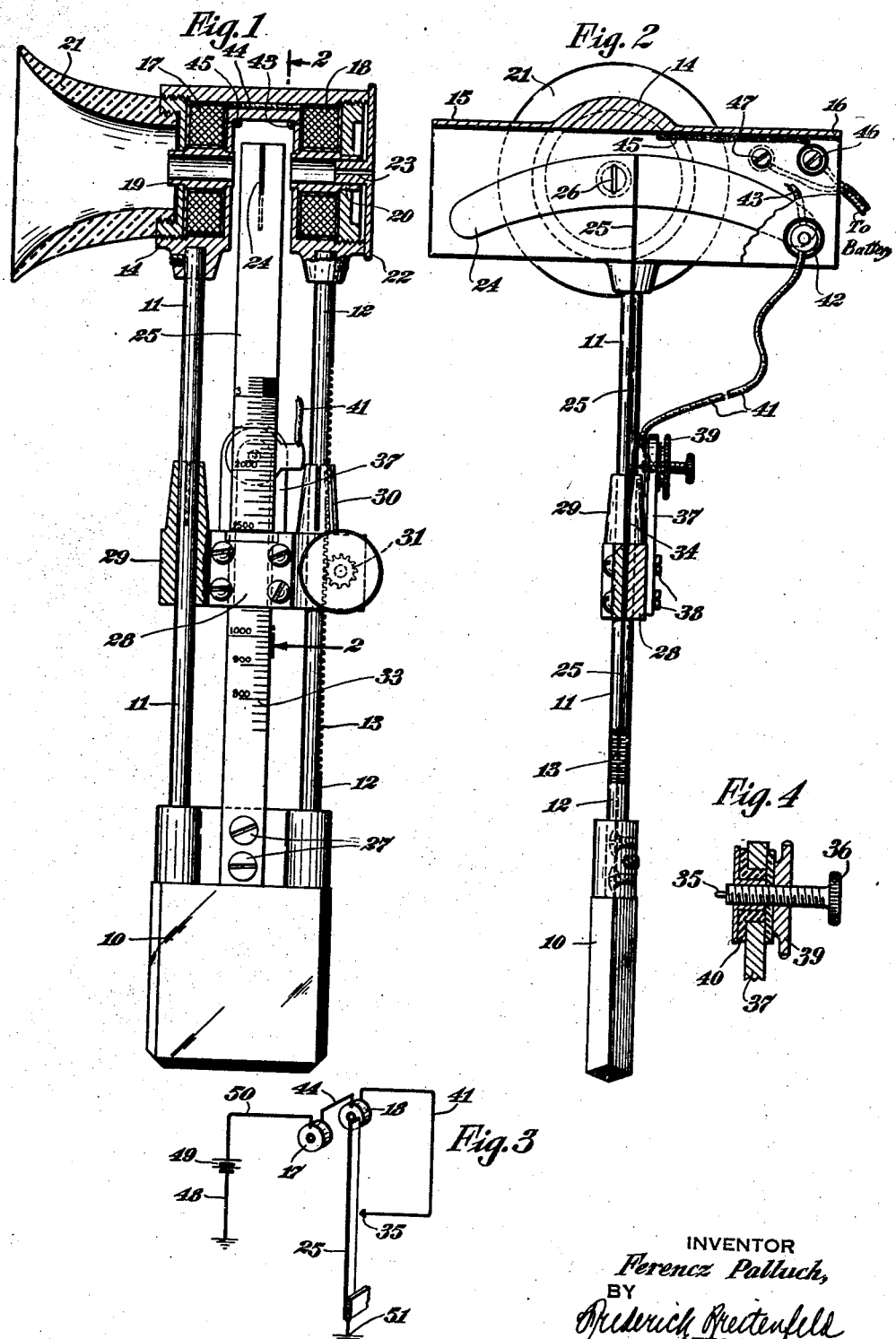

Patented Aug. 22, 1933　　　　　　　　　　　　　　　　　　　1,923,277

UNITED STATES PATENT OFFICE 1,923,277

STROBOSCOPIC DEVICE

Ferencz Palluch, Budapest, Hungary, assignor of one-half to Frank Schwartz, New York, N. Y.

Application February 6, 1931, Serial No. 513,902, and in Hungary February 10, 1930

5 Claims. (Cl. 88—14)

My present invention relates generally to testing instruments, and has particular reference to a stroboscopic device.

The type of instrument to which my present invention has particular reference is one which is used for studying or observing the successive surfaces of a periodic or varied motion by means of light periodically interrupted, as, for example, for studying and observing the operation of a flywheel or similar portion of an engine or machine undergoing a cyclical movement.

A general object of my invention is to provide an improved instrument of this general character capable of use in a simple and expeditious manner not only for the purpose of merely observing the mode of operation of a vibrating or revolving object, but also for the purpose of determining the exact speed of revolution or movement of such object.

A more particular object of my invention is to provide an instrument which is so constructed as to be capable of manufacture in an inexpensive manner; and which is so small and compact in size that it may be produced even in a size suitable for transportation in the pocket of a user. The instrument is simple to handle and manipulate and is so designed that a simple flashlight battery or similar source of power is sufficient to control its operation.

Briefly, my invention resides in the provision of a device wherein a movable diaphragm is interposed along a line of sight, the diaphragm being provided with a slit or aperture through which the light may pass whenever the slit is in registry or alignment with the line of sight.

A particular feature of my invention lies in providing an arrangement wherein the diaphragm is capable of oscillating or vibrating movement, and, more particularly, my device provides for an oscillatable or vibratable member such as a reed which controls the movements of the slitted diaphragm.

Another feature of my invention lies in providing an improved and simplified means for maintaining the reed and/or diaphragm in a state of continuous and sustained oscillation, this means being electromagnetic in nature and consisting, for example, of electromagnets which are periodically energized and deenergized for the purpose of imparting certain regular impulses to the movable elements of the device.

Another feature of my invention lies in providing an electrical circuit for the electromagnets, in which an automatic make-and-break switch is arranged, the functioning of which is controlled by the movements of the reed itself, as, for example, by mounting a movable contact member on the reed and arranging a complementary fixed contact member in the path of movement of the reed.

A further feature of my invention lies in providing a simplified means for adjusting the reed or similar vibrating member to alter its natural period of vibration or oscillation, this adjustment being capable of control without interfering with the smooth and contemplated operation of the electromagnetic means or the like for maintaining the reed in a state of sustained oscillation.

A further feature of my invention lies in providing an arrangement whereby the frequency of revolutions or cycles which are being observed may be readily indicated upon the instrument itself, and, more especially, upon the reed.

I achieve the foregoing objects, and such other objects as may hereinafter appear or be pointed out, in the manner illustratively exemplified in the accompanying drawing, in which—

Figure 1 is an elevational view of my present instrument, shown partly in cross-section;

Figure 2 is a similar view taken substantially at right angles to Figure 1, and in section substantially along the line 2—2 of Figure 1;

Figure 3 is a diagrammatic view showing the electrical circuit arrangement; and

Figure 4 is an enlarged cross-sectional view through a portion of Figure 2.

Upon a handle 10 adapted to be manually grasped are mounted two spaced guide rods 11 and 12, the latter of which is provided with teeth on one surface thereof to form a rack 13. At their upper ends, the rods 11 and 12 are mounted within the base of a frame or casing 14 of substantially cylindrical shape and provided with the oppositely projecting, lateral wing portions 15 and 16. Each wing portion is in the shape of an inverted U, having a top wall and two depending and opposed side walls, but no end wall and no bottom wall, the purpose of this arrangement being presently made clear.

Arranged within the frame 14 are the two spaced electromagnetic coils 17 and 18 which are substantially cylindrical and arranged with their axes in alignment. The core 19 of the coil 17 is hollow, and the core 20 of the magnet 18 is similarly constructed, these cores being in alignment and defining a line of sight substantially coincident with the axis of the frame 14.

On one end of the latter an eyepiece 21 is mounted, and on the opposite end a cover member 22 is arranged, provided with a relatively small bore 23 through the center thereof through which the line of sight passes.

Within the space between the magnets 17 and 18 a diaphragm or flag 24 is arranged to move, this diaphragm being somewhat crescent-shaped, as shown most clearly in Figure 2, and being mounted on the upper end of a reed or similar vibrating member 25. It is to be noted that the reed 25, which may be of spring steel or similar resilient material, is arranged in a plane parallel to the plane of the optical axis, while the diaphragm or flag 24 is arranged transversely with respect to this axis.

The diaphragm 24 is provided with a slit 26 which is in registry with the optical axis or line of sight whenever the reed 25 is at rest in its normal position. In this connection, it is to be noted, upon viewing Figure 2, that the optical axis is slightly offset with respect to the normal plane of the reed 25, this arrangement being provided for the purpose of leaving the line of sight unimpeded.

The reed 25 is fixed at its lower end, as at 27, to the handle 10; but the upper end is free to vibrate in the plane of the diaphragm 24, the oscillating movements of the diaphragm taking place within the confines of the wing portions 15 and 16.

Slidably mounted upon the rods 11 and 12 is a sleeve or locking clamp 28 which is provided with the sleeve bearings 29 and 30 adapted to engage, respectively, with the rods 11 and 12. A pinion 31, carried by this slidable member, engages with the rack 13 and is controllable by the knob or wheel 32, manipulations of the latter shifting the entire sleeve or clamp upwardly or downwardly along the rods 11 and 12.

The member 28 slidably yet firmly engages the reed 25 at its midportion, and thereby controls the effective free length or oscillatable portion of the reed. In other words, only that portion of the reed which lies above the member 28 is free to oscillate or vibrate.

Obviously, by shifting the clamp 28 upwardly, the natural period of vibration of the effective length of the reed will be increased, and by shifting it downwardly, the reed will vibrate at a lower natural frequency. In vibrating, the slit 26 will periodically cross the optical axis; and if the vibrations are properly controlled, a rotating body, such as a flywheel or the like, when viewed from the eyepiece 21, will appear to stand still or to move slowly in one direction or the other. If the wheel or similarly cyclically moving object appears to stand still, the movements of the slot 26 across the optical axis are exactly in tune with the frequency of the cycles being observed. This frequency may then be read directly upon my present instrument by reading the indicia provided on the reed 25. I have illustratively shown markings 33 representing frequencies from approximately 800 cycles per second to approximately 3500 cycles per second. In the adjustment illustrated in Figure 1, the oscillations of the reed 25 will be exactly correct to cause a moving body, having a frequency of 1500 cycles per second to appear motionless when viewed through the eyepiece 21.

The oscillations of the reed 25 are caused to be maintained by an electrical circuit which is automatically established and broken by the reed itself. A relatively movable contact strip 34 is carried by the member 28 and is adapted to encounter a relatively fixed contact point 35 whenever the reed vibrates. The member 35 is mounted on the end of a screw 36 adjustably mounted in a support 37, carried as at 38, by the member 28. A locking screw 39 is provided to hold the contact 35 in proper adjustment. An insulating bushing 40 insulates the contact 35 from the support 37.

From the contact 35 a lead 41 extends to a terminal 42 which may conveniently be mounted upon the wing portion 16. From the terminal 42 a lead 43 extends to the magnetic coil 18, and from the opposite end of this coil a wire or lead 44 extends to the other coil. From the opposite end of the latter, a lead 45 extends to a terminal 46 similarly mounted on the wing portion 16 and insulated therefrom by means of a suitable washer or bushing. A third terminal 47 is also mounted on the portion 16 and in electrical connection therewith.

From any convenient battery or similar source of power, which may, for example, be carried in the pocket or mounted in any suitable manner in association with the device, a pair of leads extend to the terminals 46 and 47. The lead 48 extending from the battery 49 to the terminal 47 is thereby connected with the ground; while the lead 50 connecting with the terminal 46 is thereby brought into electrical connection with the magnetic coil 17. The entire electrical circuit is illustrated more fully in Figure 3, it being noted that the reed 25 itself constitutes part of the circuit and is grounded, as at 51. When the device is used, the reed is caused to oscillate by touching the same with the finger or tipping the device or in any other suitable manner. As soon as the contact 34 engages the contact 35, an electrical circuit is completed, and the magnets are energized. The magnets operate to draw the reed back toward its normal position, i. e., toward the axis of the magnets. The reed, by virtue of its resilience, swings past its normal position, and in doing so contact is broken between the points 34 and 35. This breaks the circuit and deenergizes the magnets and the reed is permitted to swing again in the opposite direction by virtue of its resilience and natural tendency to vibrate. Thereupon, contact is again established between the points 34 and 35, and the magnets again energized. Thus, the magnets are periodically rendered operative and inoperative and impose certain periodic impulses upon the reed which maintain the latter in a condition of sustained oscillation at the natural frequency of the reed.

By adjusting the knob 32, the sleeve 28 is moved upwardly or downwardly, as requirements may dictate, and, as a result, the natural period of the effective length of the reed will increase or decrease accordingly. However, the contact points 34 and 35 move with the sleeve 28, and, as a result, the magnets operate in the same contemplated manner to impose periodic impulses upon the reed and maintain the same in a state of continued vibration.

Obviously, during the regular and continuous vibrations of the reed and diaphragm, the slit 26 will pass and re-pass across the optical axis at regular intervals and at a desired frequency, thereby permitting the objectives of the device to be carried out.

If desired, a source of alternating current may be used instead of the battery, in which case the reed will vibrate only when the frequency of the alternating current coincides with the natural frequency of the reed. As a result, if the source of alternating current is drawn, for example, from an electric generator of alternating current, the exact speed of revolution of the generator may be determined simply by adjusting the knob 32 until the reed vibrates, at which time the frequency of oscillation or movement is indicated upon the scale 33.

If desired, the cover member 22 may be removed and another one put in its place, the size of the bore 23 being thus controllable by selectively interchanging a group of such cover members with different bores therein.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a stroboscopic device, a frame, an oscillatable reed having one end fixed to said frame and the other end free, a sleeve carried by the frame and slidably engaging said reed and frame to prevent oscillation of the engaged portion of the reed, and means for adjusting said sleeve along the reed and frame to vary the effective free length of the reed; said last-named means comprising a rack-and-pinion arrangement between said sleeve and frame.

2. In a stroboscopic device, a frame, an oscillatable reed having one end fixed to said frame and the other end free, a sleeve carried by the frame and slidably engaging said reed and frame to prevent oscillation of the engaged portion of the reed, means for sliding the sleeve along the reed and frame to vary the effective oscillatable length of the reed, and electromagnetic means for maintaining the reed in continuous sustained oscillation even during slidable adjustments of the sleeve, comprising an electric circuit, a movable switch contact in said circuit and movable with the reed, and a relatively fixed complementary contact carried by said sleeve and engageable by the movable contact when the reed oscillates.

3. In a stroboscopic device, a frame comprising a handle, a pair of spaced guide rods on the handle, and a housing on said rods; a pair of electromagnets arranged in spaced relationship within said housing, an eyepiece on said housing commanding a line of vision through the space between said magnets, an oscillatable reed mounted between said guide rods and having one end fixed to said handle and the other end freely vibratable within the space between said magnets, a diaphragm carried by said free end and provided with a slit which crosses and recrosses said line of sight when the reed vibrates, means for periodically energizing said magnets to impart oscillational impulses to said reed in tune with the natural period of said reed, and a locking sleeve slidably mounted on said guide rods and slidably engaging said reed for varying the effective free length of the reed.

4. In a stroboscopic device, a frame, an oscillatable reed having one end fixed to said frame and the other end free, a guide rod carried by the frame, a sleeve slidably mounted on said guide rod and slidably engaging said reed to prevent oscillation of the engaged portion of the reed, and means for adjusting said sleeve along said guide rod and reed to vary the effective length of the reed; said last-named means comprising a rack on said guide rod, and a pinion carried by said sleeve and engaging said rack.

5. In a stroboscopic device, a pair of spaced, aligned electromagnets, an oscillatable reed normally offset with respect to the common axis of the magnets and having one end fixed and the other end free to vibrate between the magnets and in a plane perpendicular to said axis, a diaphragm having a slit therein and carried by the free end of the reed, and means for intermittently energizing said magnets to maintain said reed in oscillation.

PALLUCH, FERENCZ.